US012600340B2

(12) United States Patent
Bhandari et al.

(10) Patent No.: US 12,600,340 B2
(45) Date of Patent: Apr. 14, 2026

(54) ELECTRIC DRIVE SYSTEM FOR MACHINE AND ELECTRIC DRIVE CONTROL SYSTEM FOR SAME

(71) Applicant: Caterpillar Inc., Peoria, IL (US)

(72) Inventors: Aditya B. Bhandari, Peoria, IL (US); Brian E. Lister, Edwards, IL (US); Michael D. Beyer, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 257 days.

(21) Appl. No.: 17/964,690

(22) Filed: Oct. 12, 2022

(65) Prior Publication Data

US 2024/0123967 A1 Apr. 18, 2024

(51) Int. Cl.
*B60W 10/10* (2012.01)
*B60W 10/08* (2006.01)
*B60W 30/19* (2012.01)

(52) U.S. Cl.
CPC ............ *B60W 10/10* (2013.01); *B60W 10/08* (2013.01); *B60W 30/19* (2013.01); *B60W 2510/083* (2013.01); *B60W 2510/104* (2013.01); *B60W 2710/081* (2013.01); *B60W 2710/1005* (2013.01)

(58) Field of Classification Search
CPC ...... B60W 10/10; B60W 10/08; B60W 30/19; B60W 2510/083; B60W 2510/104; B60W 2710/081; B60W 2710/1005; F16H 61/0403; F16H 59/40; F16H 59/46; F16H 2059/462; F16H 2061/022; F16H 2061/0422; F16H 63/502; B60Y 2200/41; B60Y 2200/415; B60Y 2200/91
See application file for complete search history.

(56) References Cited

U.S. PATENT DOCUMENTS

| | | | |
|---|---|---|---|
| 5,036,729 A | 8/1991 | Nitz | |
| 5,439,428 A | 8/1995 | Slicker | |
| 7,074,158 B2 | 7/2006 | Watanabe | |
| 9,855,951 B1 * | 1/2018 | Lister | B60W 10/06 |
| 10,124,811 B2 | 11/2018 | Lister | |

(Continued)

FOREIGN PATENT DOCUMENTS

| | | |
|---|---|---|
| DE | 4305054 A1 | 8/1994 |
| DE | 102020123875 A1 | 3/2021 |

(Continued)

OTHER PUBLICATIONS

Written Opinion and International Search Report for Int'l. Patent Appln. No. PCT/US2023/074525, mailed Jan. 4, 2024 (14 pgs).

*Primary Examiner* — Farhana Pervin

(57) ABSTRACT

Operating an electric drive machine includes neutralizing a transmission in the electric drive machine operating in a first range, determining suitability of the electric drive machine for operating the transmission in a second range, and calculating a target transmission input speed, based on a speed parameter indicative of a transmission output speed, and the determined suitability for operating in a second range. A speed of an electric drive motor is varied based on the target transmission input speed, and a second clutch engaged to operate the transmission in the second range based on the varied speed of the electric drive motor. Related apparatus and control logic is also disclosed.

22 Claims, 4 Drawing Sheets

(56)                 References Cited

U.S. PATENT DOCUMENTS

| | | | | |
|---|---|---|---|---|
| 10,661,801 | B2 | 5/2020 | Nishihiro | |
| 11,193,583 | B2 | 12/2021 | Bradley | |
| 2016/0003326 | A1* | 1/2016 | Park | F16H 3/089 |
| | | | | 74/664 |
| 2018/0093670 | A1* | 4/2018 | Sharp | B60W 10/06 |
| 2019/0367009 | A1* | 12/2019 | Pettersson | B60W 50/0097 |
| 2021/0078412 | A1* | 3/2021 | Moubarak | B60L 15/2054 |
| 2021/0364064 | A1* | 11/2021 | Park | F16H 3/089 |
| 2022/0065346 | A1* | 3/2022 | Chen | B60K 17/354 |
| 2022/0250608 | A1* | 8/2022 | Schilder | B60K 6/387 |
| 2024/0308324 | A1* | 9/2024 | Gitt | B60K 6/48 |

FOREIGN PATENT DOCUMENTS

| | | | |
|---|---|---|---|
| DE | 102021122301 | A1 | 3/2022 |
| GB | 2568295 | B | 3/2020 |

* cited by examiner

ELECTRIC DRIVE SYSTEM FOR MACHINE AND ELECTRIC DRIVE CONTROL SYSTEM FOR SAME

TECHNICAL FIELD

The present disclosure relates generally to an electric drive system for a machine, and more particularly to a strategy for speed matching rotatable components in an electric drive system during clutch engagement.

BACKGROUND

Technology for electrification of various types of machinery has received increased engineering attention in recent years. Electric powered passenger vehicles and the like are now in widespread use throughout the world. Certain types of heavier duty equipment including mining machines and passenger trains powered by electric motors are well known and widely used. Certain other types of equipment have been slower to adopt electric power strategies, however.

In a typical electric drive machine, an electric power supply such as an electrical energy storage device or a generator produces electric power for operating one or more electric traction motors and other onboard equipment. Ground-engaging elements are driven via the electric traction motor to propel the machine. While electrification offers promise for reduction of certain emissions, electrically powered propulsion systems have given rise to many new challenges.

Some electric drive systems operate without a transmission, meaning speed and torque applied to ground-engaging elements is dependent directly on the output of one or more electric motors. In other systems, a transmission is coupled between an electric drive motor and the ground-engaging elements. Shifting gears in a transmission typically requires disengaging a clutch transferring power from the electric motor to ground-engaging elements via a first gear ratio, and reengaging another clutch to power the ground-engaging elements via a second gear ratio. Transmissions are also shifted into and out of neutral, and operated in reverse by reversing a direction of rotation of the electric motor. Engineers have observed various sensitivities to the relative speeds of rotating components in electric drive systems as well as opportunities for improved performance. One example of a drive system in a non-electric drive machine that apparently provides a target transmission control engine speed is known from U.S. Pat. No. 9,855,951 to Lister. The art provides ample room for improvements and development of alternative strategies.

SUMMARY

In one aspect, a method of operating an electric drive machine includes disengaging a first clutch to neutralize a transmission in the electric drive machine operating in a first range and coupled to an electric drive motor. The method further includes monitoring a speed parameter of the electric drive machine indicative of a transmission output speed, and determining suitability of the electric drive machine for operating the transmission in a second range. The method further includes calculating a target transmission input speed, based on the monitored speed parameter and the determined suitability of the machine for operating the transmission in the second range, and varying a speed of the electric drive motor based on the target transmission input speed. The method still further includes engaging a second clutch to operate the transmission in the second range, based on the varied speed of the electric drive motor.

In another aspect, an electric drive system for an electric drive machine includes an electric drive motor, and a transmission including a transmission input coupled to the electric drive motor, a transmission output, a first clutch and a second clutch each coupled between the transmission input and the transmission output to operate the transmission in a first range and a second range, respectively. The electric drive system further includes a control system having a sensor structured to monitor a speed parameter of the electric drive machine indicative of a transmission output speed, and an electric drive controller in communication with the sensor. The electric drive controller is structured to determine suitability of the electric drive machine for shifting the transmission from neutral to a one of the first range or the second range, and to calculate a target transmission input speed, based on the monitored speed parameter and the determined suitability of the electric drive machine for shifting the transmission from neutral to the one of the first range or the second range. The electric drive controller is further structured to vary a speed of the electric drive motor based on the target transmission input speed, and to command engaging one of the first clutch or the second clutch corresponding to the one of the first range or the second range, based on the varied speed of the electric drive motor.

In still another aspect, an electric drive control system includes an electric drive controller structured to receive a first speed signal indicative of a transmission output speed of a transmission in an electric drive machine, receive a second speed signal indicative of a transition input speed of the transmission, and to determine suitability of the electric drive machine for shifting the transmission from neutral to a one of a first range or a second range of the transmission. The electric drive controller is further structured to output a motor control command varying a speed of an electric drive motor coupled to a transmission input of the transmission. The electric drive controller is further structured to calculate a transmission input speed error based on a difference between the transmission input speed and a target transmission input speed, and output a clutch engagement command for engaging one of a first clutch or a second clutch corresponding to the one of the first range or the second range, respectively, at a timing that is based on the transition input speed error.

DETAILED DESCRIPTION

Figure 1:
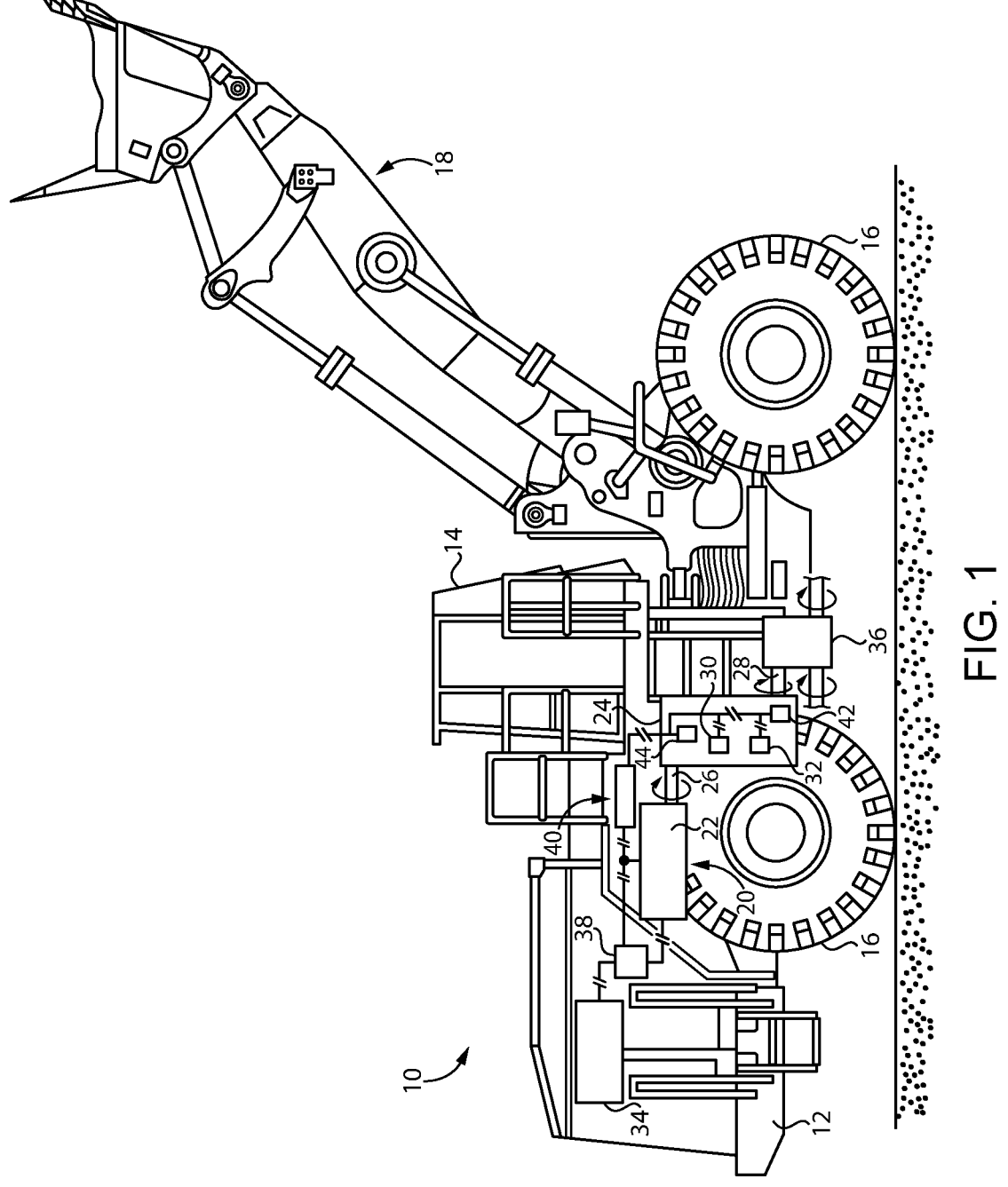
FIG. 1 is a side diagrammatic view of an electric drive machine, according to one embodiment.

Referring to FIG. 1, there is shown an electric drive machine 10, according to one embodiment. Machine 10 includes a frame 12, typically having articulating front and back frame units (not numbered), supporting an operator cab 14 and a plurality of ground-engaging elements 16. Ground-engaging elements 16 are wheels in the illustrated embodiment but could be tracks in other implementations, or machine 10 could even have a half-track configuration. Machine 10 includes a hydraulically actuated implement system 18 including a boom and a bucket (not numbered) but could include other types of implement systems such as a blade or no implement system in some embodiments. Machine 10 is shown in the context of a wheel loader, but could instead be a motor grader, a truck, a tractor, a scraper, a variety of other types of off-highway machines, an on-highway machine, or even a marine vessel.

Machine 10 includes an electric drive system 20 having an electric drive motor 22, and a transmission 24 including a transmission input 26 coupled to electric drive motor 22, and a transmission output 28. Transition input 26 could include a transmission input shaft, a shaft assembly, or a transmission input gear, and transmission output 28 could include a transmission output shaft, a shaft assembly, or an output gear to name a few examples. Transmission 24 also includes a first clutch 30 and a second clutch 32 each coupled between transition input 26 and transmission output 28 to operate transmission 24 in a first range and a second range, respectively. Transmission 24 may include a mechanical transmission having a finite number of available gear ratios, for example, a total of two available gear ratios. In other embodiments a different finite number of gear ratios might be available, or potentially an infinite number of effective gear ratios as might be available in a hydrostatic or hydro-mechanical transmission, or a continuously variable mechanical transmission.

Electric drive system 20 may also include an electrical energy storage device such as a battery, a capacitor, or combinations of these. A lower powertrain 36 is coupled to transmission output 28 and may be structured to provide torque to one or both of front ground-engaging elements 16 and back ground-engaging elements 16 in a two-wheel or four-wheel drive application. Power electronics 38 are coupled between electrical energy storage device 34 and electric drive motor 22. In other embodiments, rather than an electrical energy storage device, electric power could be provided in electric drive system 20 from a generator or a fuel cell. Electric drive system 20 also includes an electric drive control system 40.

Figure 2:
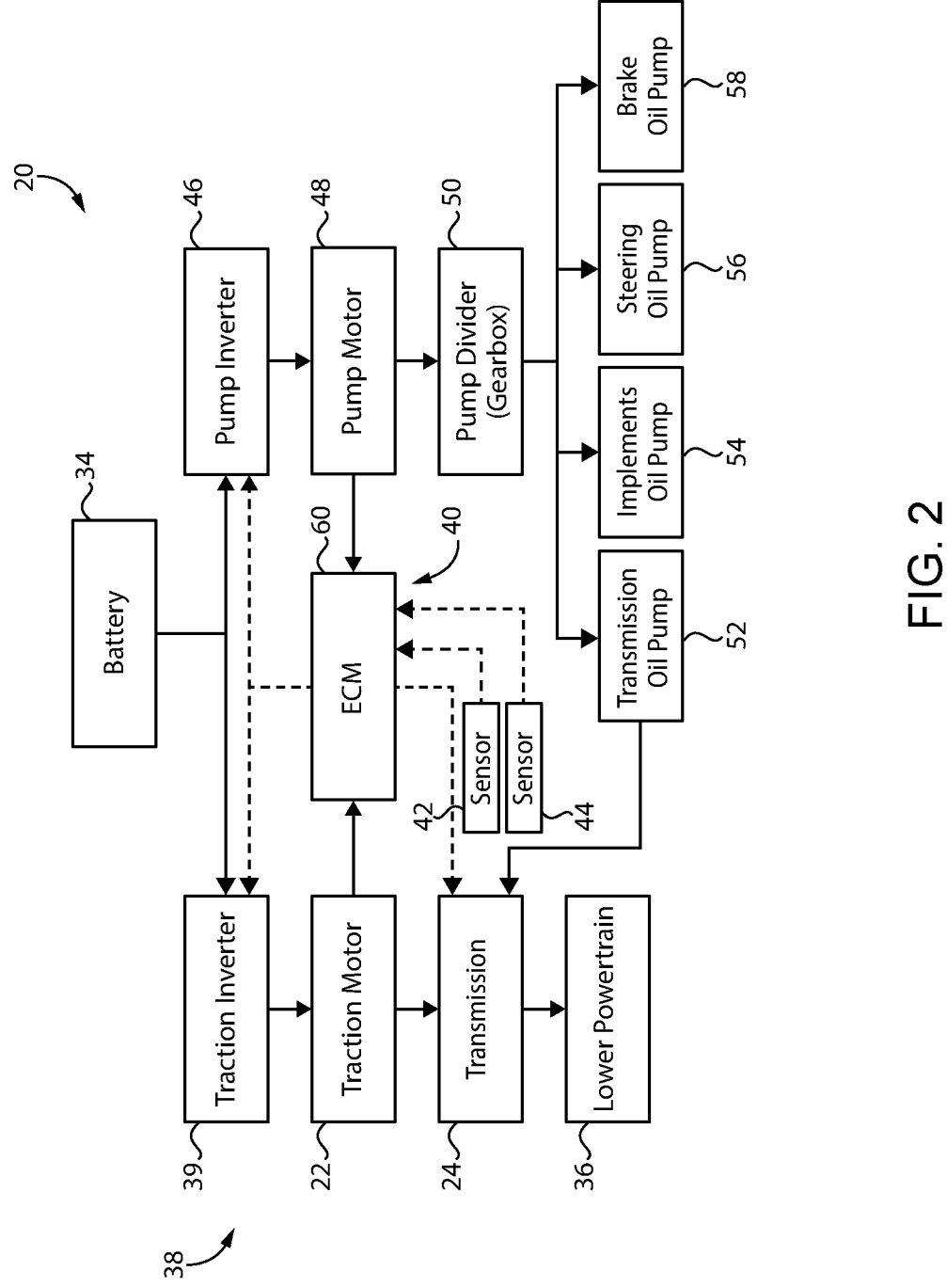
FIG. 2 is a block diagram of an electric drive system, according to one embodiment.

Control system 40 includes a sensor 42 (by way of non-limiting example, shown in FIG. 1 as part of transmission 24) structured to monitor a speed parameter of electric drive machine 10 indicative of a transmission output speed, and an electric drive controller 60 in communication with sensor 42 and having features and functionality further discussed herein. Referring also now to FIG. 2, there is shown a block diagram illustrating additional features and components of electric drive system 20. Electrical energy storage device 34 is shown as a battery 34, electrically connected to a traction inverter 39 of power electronics 38, and electrically connected to a pump inverter 46. Traction inverter 39 is electrically connected to electric drive motor or traction motor 22, in turn coupled to transmission 24. As noted above, transmission 24 may be but is not necessarily a two-speed transmission. Transmission 24 is in turn coupled to lower powertrain 36. Pump inverter 46 is electrically connected to a pump electric motor 48, in turn operable to rotate a pump divider or gearbox 50. Gearbox 50 is coupled to a transmission oil pump 42, an implements oil pump 54, a steering oil pump 56, and a brake oil pump 58.

Figure 3:
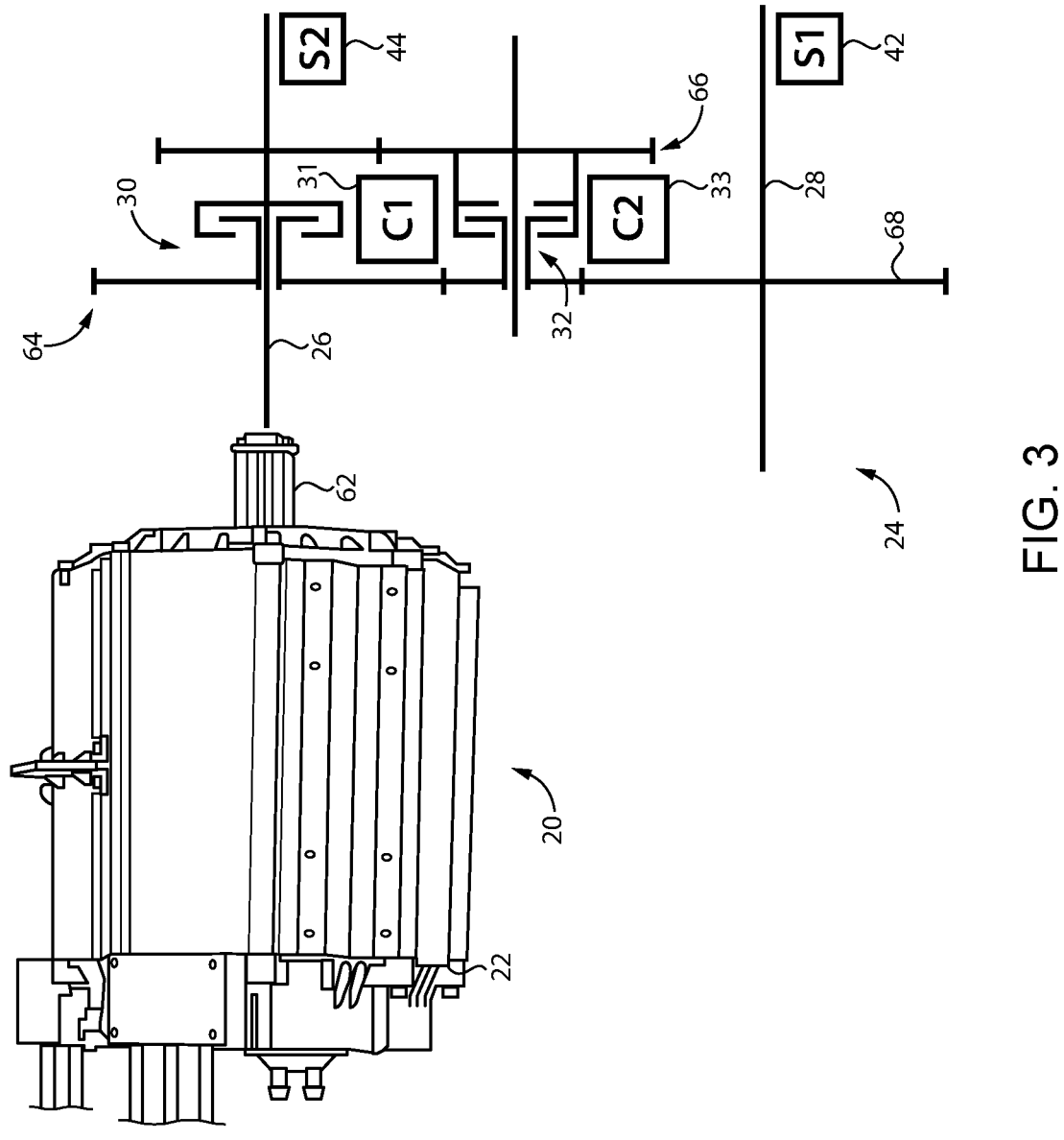
FIG. 3 is a diagrammatic view of an electric drive system, according to one embodiment.

Turning now also to FIG. 3, there are shown still other features of electric drive system 30. Electric drive motor 22 includes a motor output shaft 62 that may be directly coupled to transmission input 26 in transmission 24. Thus, transmission input 26 may be fixed to rotate with motor output shaft 62, although a gearbox or a lockup clutch or the like could be coupled between transmission input 26 and motor output shaft 62 within the scope of the present disclosure. As noted above, transmission 24 may include a mechanical transmission structured to operate in a first gear range and a second gear range, such as a low range and a high range. Transmission 24 also includes first clutch 30 and second clutch 32. A first clutch actuator 31 (C1), such as a hydraulic or electrical clutch actuator, is coupled to first clutch 30 and operated by way of electronic control commands from electric drive controller 60 to engage and disengage to operate transmission 24 in the first range. A second clutch actuator 33 (C2) is analogously structured and operable to engage and disengage second clutch 32 to operate transmission 24 in the second range. When neither of first clutch 30 nor second clutch 32 is engaged, transmission 24 is neutralized. A first gear combination 64 is coupled between first clutch 30 and transmission output 28 and may include at least two gears in mesh that rotate an output gear 68. A second gear combination 66 is coupled between transmission input 26 and transmission output 28 and likewise includes at least two gears in mesh that operate to rotate output gear 68. The present disclosure is applicable regardless of the specific clutch configuration employed. Thus, one or both of first clutch 30 and second clutch 32 could be either of a so-called stationary (or brake) clutch or a rotating clutch.

It will be recalled control system 40 includes sensor 42 to monitor a speed parameter of electric drive machine 10 indicative of a transmission output speed. In the illustrated embodiment sensor 42 (S1) may be coupled to transmission output 28 to measure transmission output speed directly. In other embodiments, a sensor could monitor a different speed parameter such as a speed of rotation of another component in transmission 24 or in electric drive system 20 generally having a known or determinable relationship to transmission output speed. Transmission output speed could also be monitored indirectly by sensing a ground speed of machine 10. It is generally desirable to monitor transmission output speed, directly or indirectly, for purposes of determining suitability of electric drive machine 10 for operating transmission 24 in the first range, the second range, or potentially other ranges based upon a ground speed of machine 10, as further discussed herein. Sensor 42 produces a first speed signal indicative of transmission output speed.

Another sensor 44 (S2) is coupled to transmission input 26 and can monitor a speed of rotation thereof. It will be appreciated that sensor 44 could be arranged to monitor a speed of rotation of a different part of electric drive system 20 having a known or determinable relationship to transmission input speed. Sensor 44 produces a second speed signal indicative of transmission input speed. As will be further apparent from the following description, transmission input speed can be controlled upon clutch engagement to ensure smoothness of shifting and hasten availability of transfer of power through transmission 24, particularly when shifting from neutral to one of the first range or the second range, as compared to certain known strategies.

Returning to features and functionality of electronic controller 60, the term "electronic controller" should be understood herein to include a single computerized electronic control unit such as a microprocessor or a microcontroller, or a combination of multiple electronic control units. Electronic controller 60 will typically include or be in communication with a suitable computer readable memory storing computer executable program instructions which, upon execution, cause electric drive controller 60 to perform the logical functions discussed herein. Example suitable computer readable memory can include RAM, ROM, SDRAM, EPROM, FLASH, or still another.

Figure 4:
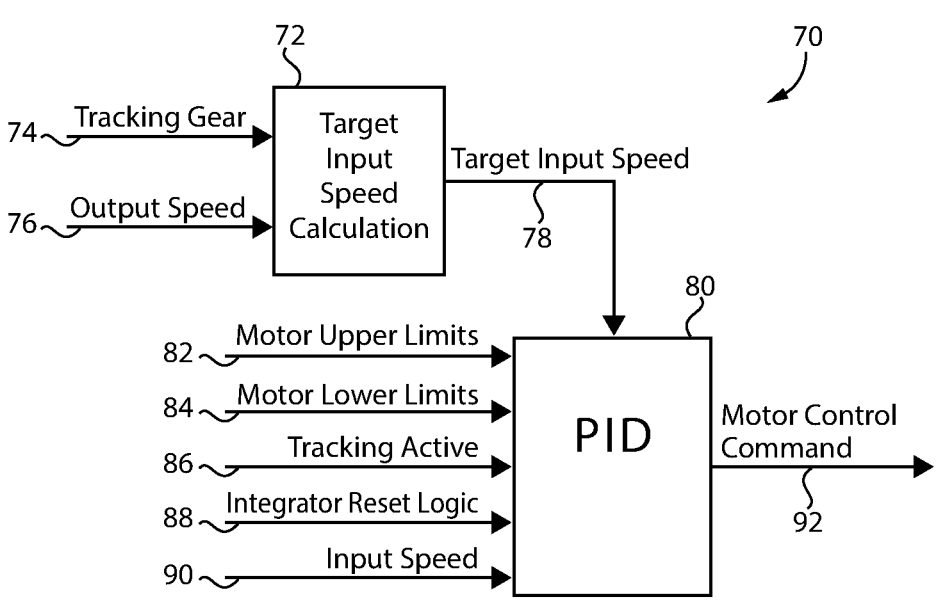
FIG. 4 is a block diagram of logical calculations, according to one embodiment.

Referring also now to FIG. 4, electric drive controller 60 may be structured to determine suitability of machine 10 for shifting transmission 24 from neutral to a one of the first range or the second range. Electric drive controller 60 may be further structured to calculate a target transmission input speed, based on the monitored speed parameter indicative of transmission output speed and the determined suitability of machine 10 for shifting transmission 24 from neutral to the one of the first range or the second range. Electric drive controller 60 may be further structured to vary a speed of electric drive motor 22 based on the target transmission input speed, and to command engaging one of first clutch 30 or second clutch 32 corresponding to the one of the first range or the second range, based on the varied speed of electric drive motor 22.

The varied speed of electric drive motor 22 may be such that a difference between a rotation speed of a rotatable portion of first clutch 30 or second clutch 32 and a rotation speed of transmission output 28 does not exceed a target difference. It is generally desirable for engagement of first clutch 30 or second clutch 32 to occur with a zero relative speed between the engaging components, or a relative speed within a relatively small error range. Thus, a target difference in relative speed between a rotatable portion of first clutch 30 or second clutch 32 and a rotation speed of a rotatable output portion of transmission 24 such as transmission output 28 may be limited to a target difference. When transmission 24 is in gear speeds of transmission input 26 and transmission output 28 will differ to a degree dependent upon which of gear arrangements 64 and 66 is active to transfer torque. Thus, when transmission 24 is engaged in the first range transmission input speed might be "X %" greater than (or less than) transmission output speed and when transmission 24 is engaged in the second range transmission input speed might be "Y %" greater than (or less than) transmission output speed. Transmission input speed and transmission output speed might also be equal in the first range or the second range, thus X % or Y % might be equal to 0% in some implementations. When clutch 30 or 32 is to be engaged the target difference might be X % or Y %, respectively, plus or minus 0.5%, 1%, 2%, or another tolerance. Analogously, electronic controller 60 can be understood to match a speed of a first engaging clutch portion having a fixed speed of rotation relative to transmission input 26 to a second engaging clutch portion having a fixed speed of rotation relative to transmission output 28. As further discussed herein, a target difference in speeds of rotation of the first engaging clutch portion and the second engaging clutch portion within each of clutch 30 and clutch 32 upon clutch engagement may be zero, plus or minus 0.5%, 1%, 2%, etc. The tolerance ranges disclosed are purely exemplary, and could be tighter or looser in various applications.

In FIG. 4, calculations 70 are shown including a target input speed calculation 72 and a motor control command calculation 80. Calculation 72 can be performed by receiving a tracking gear logical input 74 and a transmission output speed input 76 (a second speed signal as discussed herein). The tracking gear logical input 74 may include, for example, a first input or first input value if machine 10 is traveling at a ground speed appropriate for operation in the first range, and a second input or second input value if machine 10 is traveling at a ground speed appropriate for operation in the second range. In one implementation, at a relatively lower ground speed indicated by a relatively lower transmission output speed, machine 10 might be suitable for operating transmission 24 in the first range. At a relatively higher ground speed indicated by a relatively greater transmission output speed, machine 10 may be suitable for operating transmission 24 in the second range. Additional available gear ratios could be assessed for suitability in a generally analogous manner.

Thus, the determined suitability may include a determined gear ratio suitability, and electric drive controller 60 may be structured to determine the gear ratio suitability via executing tracking gear logic linking availability of the one of the first range or the second range to transmission output speed. It should further be appreciated that a conclusion of suitability of machine 10 for operating transmission 24 in the first range could be reached by determining machine 10 is not suited for operating transmission 24 in the second range, and vice versa. Execution of the tracking gear logic could include determining which of any of the ranges is available, which are not available, and other combinations and extensions of these logical functions including quantitative or qualitative determinations of range availability based on factors external to machine 10 such as the speed parameters discussed, as well as factors external to machine 10 such as a ground surface grade or a load weight carried or pushed by implement system 18 or towed by machine 10.

Calculation 72 produces (calculates) a target transmission input speed 78 which is fed to calculations 80. Calculations 80 may be performed via a proportional controller, such as a proportional integral (PI) controller or a proportional integral derivative (PID) controller. Other types of controllers could nevertheless be used. In an implementation, electric drive controller 60 is structured to calculate a transmission input speed error, and to calculate a motor control command 92 for varying the speed of electric drive motor 22 based on the transmission input speed error. In a proportional controller implementation, a motor max speed or motor upper limits input 82 and a motor min speed or motor lower limits input 84 may be received to prevent exceeding limits of electric drive motor 22. Calculations 80 may also be performed based on a tracking active input 86, an integrator reset logical input 88, and a transmission input speed input 90 (a second speed signal as discussed herein). The tracking active input 86 may indicate whether tracking gear logic is activated. The integrator reset logical input 88 can reset the integrator in a PI or PID control to avoid excessive overshoot or undershoot when at or near the speed limits of the capacity of electric drive motor 22.

Calculations 80 can thus be understood as calculating a transmission input speed error, such as a numerical input speed error and calculating motor control command 92 which is output to reduce the transmission input speed error and thereby provide a transmission input speed that limits relative speeds in first clutch 30 or second clutch 32 upon engagement to zero or a predetermined tolerance of zero as described herein. Motor control command 92 may include one of a motor torque command or a motor speed command. In the case of a motor torque command, the motor torque command can be outputted to inverter 39.

INDUSTRIAL APPLICABILITY

Figure 5:
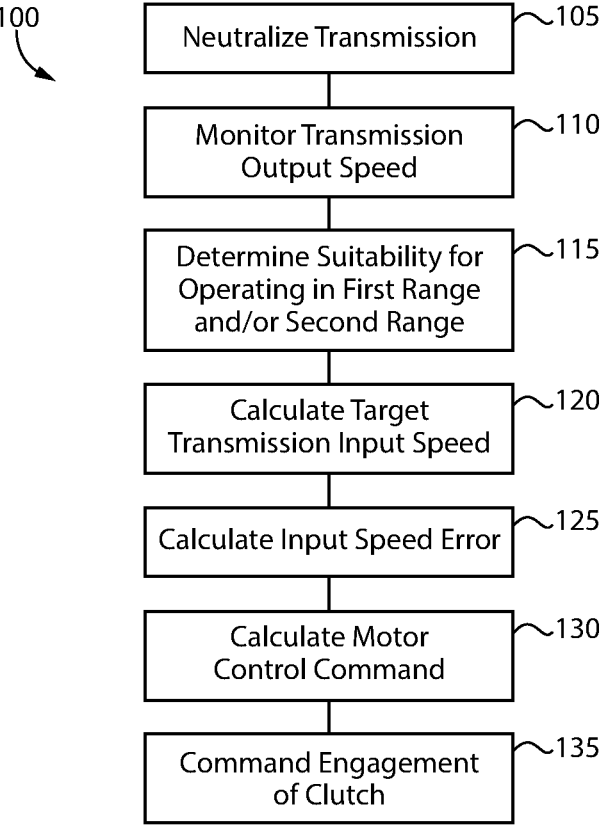
FIG. 5 is a flowchart illustrating example methodology and logic flow, according to one embodiment.

Referring also now to FIG. 5, there is shown a flowchart 100 illustrating example methodology and logic flow, according to one embodiment. At a block 105 transmission 24 is neutralized, meaning first clutch 30 or second clutch 32 has been disengaged to neutralize transmission 24 in machine 10 operating in one of a first range or a second range. When transmission 24 is neutralized, if machine 10 is moving it may tend to coast. Depending upon ground conditions such as grade, load carried, pushed, or towed, and whether an operator applies brakes or not, a ground speed of machine 10 may vary after neutralizing transmission 24. Thus, while machine 10 might have been operating transmission 24 in the second range when transmission 24 is neutralized, after neutralizing transmission 24 machine 10 may be suited for operating transmission 24 in the first range, or vice versa, depending upon a varied ground speed.

From block 105 the logic advances to a block 110 to monitor a speed parameter of machine 10 indicative of transmission output speed, such as monitoring transmission output speed directly as discussed herein. From block 110 the logic advances to a block 115 to determine suitability of machine 10 for operating transmission 24 in the first range and/or the second range. It should be appreciated that at block 115 suitability of machine 10 for operating transmission 24 in the first range may be logically analogous to determining unsuitability of machine 10 for operating transmission 24 in the second range. As also discussed herein, the determined suitability may include a determined gear ratio suitability based on transmission output speed.

From block 115 the logic may advance to a block 120 to calculate the target transmission input speed as discussed herein, such as by calculating a target input speed that corresponds to a measured transmission output speed accounting for the determined gear ratio suitability. Put differently, at block 120 electronic controller 60 may be understood to calculate what transmission input speed is appropriate, in whichever of the first range or the second range is appropriate, for a present transmission output speed.

From block 120 the logic advances to a block 125 to calculate the transmission input speed error, such as by calculating a difference between the target transmission input speed and a measured transmission input speed. From block 125 the logic may advance to a block 130 to calculate the appropriate motor control command, including a motor torque command or a motor speed command as discussed herein. From block 130 the logic may advance to a block 135 to command engagement of the one of first clutch 30 and second clutch 32 that corresponds to the suitable and available first range or second range. Commanding engagement of the corresponding one of first clutch 30 or second clutch 32 may occur at a timing based on the transmission input speed error such as a timing at which the transmission input speed error is zero or within a predefined tolerance of zero.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise. As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

What is claimed is:

1. A method of operating an electric drive machine comprising:

disengaging a first clutch, including disengaging a first rotatable clutch input portion from a first rotatable clutch output portion, to neutralize a transmission in the electric drive machine operating in a first range and coupled to an electric drive motor where the first clutch transmits torque from the electric drive motor via a first gear combination to a transmission output;

monitoring a speed parameter of the electric drive machine indicative of a transmission output speed;

determining suitability of the electric drive machine for operating the transmission in a second range;

calculating a target transmission input speed, based on the monitored speed parameter and the determined suitability of the machine for operating the transmission in the second range;

varying a speed of the electric drive motor based on the target transmission input speed; and engaging a second clutch, including engaging a second rotatable clutch input portion with a second rotatable clutch output portion, to operate the transmission in the second range where the second clutch transmits torque from the electric drive motor via a second, different gear combination to the transmission output, based on the varied speed of the electric drive motor;

wherein the second rotatable clutch input portion is rotatable at a speed different from a speed of the first rotatable clutch input portion, and speed ratios, between a motor output of the electric drive motor and each respective one of the first rotatable clutch input portion and the second rotatable clutch input portion, are fixed; and wherein an actual transmission input speed is controlled upon engagement of the second clutch via the varied speed of the electric drive motor while the electric drive motor is supplied with electrical power.

2. The method of claim 1 wherein the varied speed of the electric drive motor is such that a difference between a rotation speed of a rotatable portion of the second clutch and a rotation speed of a rotatable output portion of the transmission is limited to a target difference.

3. The method of claim 1 further wherein a ground speed of the electric drive machine varies after neutralizing the transmission.

4. The method of claim 1 wherein the determining suitability of the electric drive machine includes determining suitability for operating the transmission in the first range using the first clutch and a first gear ratio between a transmission input shaft and a transmission output shaft or in the second range using the second clutch and a second gear ratio between the transmission input shaft and the transmission output shaft.

5. The method of claim 1 wherein the transmission includes a finite number of available gear ratios.

6. The method of claim 5 wherein the finite number of available gear ratios is two.

7. The method of claim 1 further comprising calculating a motor control command including one of a motor torque command or a motor speed command, and wherein the varying the speed of the electric drive motor includes varying the speed of the electric drive motor based on the motor control command.

8. The method of claim 7 wherein the calculating a motor control command includes calculating the motor control command via a proportional controller.

9. The method of claim 8 further comprising receiving as inputs to the proportional controller the target transmission input speed and a monitored transmission input speed.

10. The method of claim 7 further comprising calculating a transmission input speed error based on a difference between the transmission input speed and a target transmission input speed, and the calculating the motor control command is based on the transmission input speed error.

11. The method of claim 7 further comprising supplying electric power to the electric drive motor from an electrical energy storage device by way of an inverter, and wherein the motor control command includes a motor torque command outputted to the inverter.

12. An electric drive system for an electric drive machine comprising:

an electric drive motor;

a transmission including a transmission input coupled to the electric drive motor, a transmission output, a first clutch and a second clutch each coupled between the transmission input and the transmission output to operate the transmission, respectively, in a first range transmitting torque from the transmission input via a first gear combination to the transmission output and a second range transmitting torque from the transmission input via a second, different gear combination to the transmission output;

the first clutch having a first rotatable clutch input portion and a first rotatable clutch output portion, and the second clutch having a second rotatable clutch input portion and a second rotatable clutch output portion, wherein the second rotatable clutch input portion is rotatable at a speed different from a speed of the first rotatable clutch input portion, and wherein speed ratios, between a motor output of the electric drive motor and each respective one of the first rotatable clutch input portion and the second rotatable clutch input portion, are fixed;

a control system including a sensor structured to monitor a speed parameter of the electric drive machine indicative of a transmission output speed, and an electric drive controller in communication with the sensor and structured to:

determine suitability of the electric drive machine for shifting the transmission from neutral to a one of the first range or the second range;

calculate a target transmission input speed, based on the monitored speed parameter and the determined suitability of the electric drive machine for shifting the transmission from neutral to the one of the first range or the second range;

vary a speed of the electric drive motor based on the target transmission input speed;

command engaging one of the first clutch or the second clutch corresponding to the one of the first range or the second range, based on the varied speed of the electric drive motor; and control an actual transmission input speed upon engagement of the one of the first clutch or the second clutch via the varied speed of the electric drive motor while the electric drive motor is supplied with electrical power.

13. The electric drive system of claim 12 wherein the varied speed of the electric drive motor is such that a difference between a rotation speed of a rotatable portion of the engaged first clutch or second clutch and a rotation speed of the transmission output does not exceed a target difference.

14. The electric drive system of claim 12 wherein the electric drive controller is further structured to calculate a transmission input speed error based on a difference between the transmission input speed and a target transmission input speed, and to calculate a motor control command for varying the speed of the electric drive motor based on the transmission input speed error.

15. The electric drive system of claim 14 wherein the electric drive controller is further structured to calculate the transmission input speed error via a proportional controller structured to receive as inputs a motor max speed, a motor min speed, and an integrator reset.

16. The electric drive system of claim 12 wherein the determined suitability includes a determined gear ratio suitability based on the transmission output speed.

17. The electric drive system of claim 12 wherein the transmission includes a mechanical transmission having a finite number of available gear ratios.

18. The electric drive system of claim 12 further comprising an electrical energy storage device, and an inverter coupled between the electrical energy storage device and the electric drive motor.

19. An electric drive system comprising:

a transmission including a first clutch having a first rotatable clutch input portion and a first rotatable clutch output portion, and a second clutch having a second rotatable clutch input portion and a second rotatable clutch output portion, and wherein the second rotatable clutch input portion is rotatable in the transmission at a speed different from a speed of the first rotatable clutch input portion;

the transmission further including a transmission input, a transmission output, a first gear combination coupled between the transmission input and the transmission output, and a second, different gear combination coupled between the transmission input and the transmission output, and wherein speed ratios, between the transmission input and each respective one of the first rotatable clutch input portion and the second rotatable clutch input portion, are fixed;

an electric drive controller structured to:

receive a first speed signal indicative of a transmission output speed of the transmission in an electric drive machine;

receive a second speed signal indicative of a transmission input speed of the transmission;

determine suitability of the electric drive machine for shifting the transmission from neutral to a one of a first range where the first clutch transmits torque from the transmission input to the transmission output via the first gear combination or a second range where the second clutch transmits torque from the transmission input to the transmission output via the second gear combination;

output a motor control command varying a speed of an electric drive motor coupled to a transmission input of the transmission;

calculate a transmission input speed error based on a difference between the transmission input speed and a target transmission input speed;

output a clutch engagement command for engaging one of the first clutch or the second clutch corresponding to the one of the first range or the second range, respectively, at a timing that is based on the transmission input speed error; and control an actual transmission input speed upon engagement of the one of the first clutch or the second clutch via the varying the speed of the electric drive motor while the electric drive motor is supplied with electrical power.

20. The electric drive system of claim 19 wherein the electric drive controller is further structured to calculate the target transmission input speed based on the first speed signal, and to output the clutch engagement command when a value of the transmission input speed error is zero or within a predetermined tolerance of zero.

21. The electric drive system of claim 20 wherein the electric drive controller includes a proportional controller, and the motor control command includes a motor torque command calculated via the proportional controller based on the transmission input speed error.

22. The electric drive system of claim 19 wherein:

the determined suitability includes a determined gear ratio suitability based on the transmission output speed; and the electric drive controller is further structured to determine the gear ratio suitability via executing tracking gear logic linking availability of the one of the first range or the second range to the transmission output speed.

* * * * *